United States Patent [19]

Takashima

[11] Patent Number: 5,138,984
[45] Date of Patent: Aug. 18, 1992

[54] CYLINDER INJECTION TYPE TWO CYCLE ENGINE

[75] Inventor: Kazutoshi Takashima, Hamamatsu, Japan

[73] Assignee: Sanshin Kogyo Kabushiki Kaisha, Hamamatsu, Japan

[21] Appl. No.: 558,246

[22] Filed: Jul. 24, 1990

[30] Foreign Application Priority Data

Jul. 24, 1989 [JP] Japan .................. 1-190901

[51] Int. Cl.$^5$ ............................................. F02B 33/04
[52] U.S. Cl. ............................ 123/73 A; 123/73 AD; 123/73 CB
[58] Field of Search ............ 123/73 A, 73 AD, 73 B, 123/73 C, 73 R, 73 CB, 304

[56] References Cited

U.S. PATENT DOCUMENTS

| | | | |
|---|---|---|---|
| 3,916,851 | 11/1975 | Otani | 123/73 A |
| 4,462,346 | 7/1984 | Haman et al. | 123/73 A |
| 4,765,304 | 8/1988 | Brown | 123/73 CB |
| 4,779,581 | 10/1988 | Maier | 123/73 AD |
| 4,898,127 | 2/1990 | Phillips et al. | 123/73 A |
| 4,905,638 | 3/1990 | Curtis et al. | 123/73 A |
| 4,920,933 | 5/1990 | Iwai et al. | 123/73 A |

Primary Examiner—David A. Okonsky
Assistant Examiner—M. Macy
Attorney, Agent, or Firm—Ernest A. Beutler

[57] ABSTRACT

A fuel supply system for a two cycle crankcase compression internal combustion engine embodying direct cylinder injection and carburetors for supplying a fuel air mixture to the crankcase chambers of the engine for high speed cooling. The direct fuel injectors supply the fuel at the low speed operation and a fixed amount of fuel at mid range and high speed, while the carburetor supplies only the mid range and high speed requirements of the engine in combination with the fuel injectors. Fuel is supplied first to the fuel bowls of the carburetors which have a vapor vent and then from the fuel bowls to the fuel injectors so as to avoid the necessity of a separate vapor separator for the fuel injectors.

31 Claims, 4 Drawing Sheets

CYLINDER INJECTION TYPE TWO CYCLE ENGINE

BACKGROUND OF THE INVENTION

This invention relates to a cylinder injection type two cycle engine and more particularly to an improved fuel supply system for an engine.

The advantages of providing two cycle crankcase compression internal combustion engines with direct cylinder fuel injection are well recognized. Such direct injection has the advantage of insuring more accurate control of fuel supply and a better control of the exhaust gas emission from such engines. However, in connection with the use of direct cylinder injection, the piston and specifically the lower area of the piston does not receive the normal cooling as when the engine is supplied with the fuel/air charge from the crankcase of the engine wherein the gas is compressed. Thus, piston overheating can be a problem with engines wherein only direct cylinder injection is provided.

It has, therefore, been proposed to employ an auxiliary fuel injection system that injects fuel into the crankcase chambers so as to fully cool the piston and some of the other components within the crankcase such as the connecting rod and bearing journals. However, the use of such multiple fuel injectors gives rise to a number of problems. First, it is important that the metering system be very accurate so as to insure that oversupplies of fuel are not provided and also so as to insure that the adequate cooling of the piston and other components will be achieved, particularly under high speed performance. In addition, it is necessary to provide an arrangement for separating the fuel vapors from the fuel before it is delivered to the injection nozzles. The use of multiple injectors can complicate the vapor separation with conventional engines.

It is, therefore, a principal object of this invention to provide an improved arrangement for providing a two cycle engine with direct cylinder injection but also in which some fuel is supplied to the crankcase chambers for cooling the piston, at least under high speed running.

It is a further object of this invention to provide a fuel supply system of the type as aforedescribed wherein all of the fuel is not supplied by fuel injectors.

It is yet another object of this invention to provide a fuel supply system for a two cycle crankcase compression internal combustion engine wherein a carburetor system is employed for supplying a fuel air mixture to the crankcase chambers and the engine also employs direct fuel injectors for supplying fuel directly to the combustion chambers.

As is noted above, the use of fuel injectors for an engine requires the addition of a vapor separator so as to insure that the fuel injectors will operate properly. However, it is also known that carbureted engines employ a float bowl in which the fuel is maintained at a uniform head by a float operated valve and in which a vent system is provided so that the air pressure above the fuel bowl will be the same as the static pressure existing in the induction system.

It is, therefore, a further object of this invention to provide an improved combination of carburetor and fuel injector wherein the fuel is supplied to the fuel injector from the vented fuel bowl of the carburetor so as to avoid the use of a separate vapor separator for the injector.

As noted above, in systems where there is provided a fuel supply to the engine that is direct into the combustion chambers and wherein additional fuel is also supplied to the crankcase chambers at least under high speed running for piston cooling, the fuel control system can be quite complicated.

It is, therefore, a still further object of this invention to provide a simplified fuel control system for an engine wherein fuel is supplied both directly to the combustion chambers and to the crankcase chambers for at least piston cooling.

SUMMARY OF THE INVENTION

A first feature of this invention is adapted to be embodied in a charge forming system for a two cycle crankcase compression internal combustion engine that comprises a carburetor and manifold system for supplying a fuel air mixture to the crankcase of the engine at least under certain running conditions. A fuel injector is also provided for delivering at least fuel to a portion of the engine other than the crankcase for running at least certain running conditions. Means supply fuel to the carburetor and the fuel injector.

Another feature of this invention is adapted to be embodied in a charge forming system for an engine comprising a carburetor for supplying a fuel air mixture to the engine and which carburetor has a fuel bowl. Means are provided for supplying fuel to the fuel bowl and a vapor vent is incorporated for venting vapors from the fuel bowl. A fuel injector is provided also for supplying fuel to the engine. Means are incorporated for delivering fuel from the fuel bowl to the fuel injector for removing vapors from the fuel supply thereto without requiring a separate vapor separator for the fuel injector.

Another feature of the invention is adapted to be embodied in a charge forming system for a two cycle crankcase compression internal combustion engine having a first charge forming system for supplying fuel directly to the combustion chambers of the engine and a second fuel supplying system for supplying fuel to the crankcase of the engine. In accordance with this feature of the invention, the first fuel supply system supplies fuel for low speed running and a fixed supply of fuel from mid range to wide open throttle. The second fuel supply supplies fuel only at the mid and high ranges of engine performance and provides a variable fuel supply during substantially its entire delivery stage.

DETAILED DESCRIPTION OF THE PREFERRED EMBODIMENT OF THE INVENTION

Figure 1:
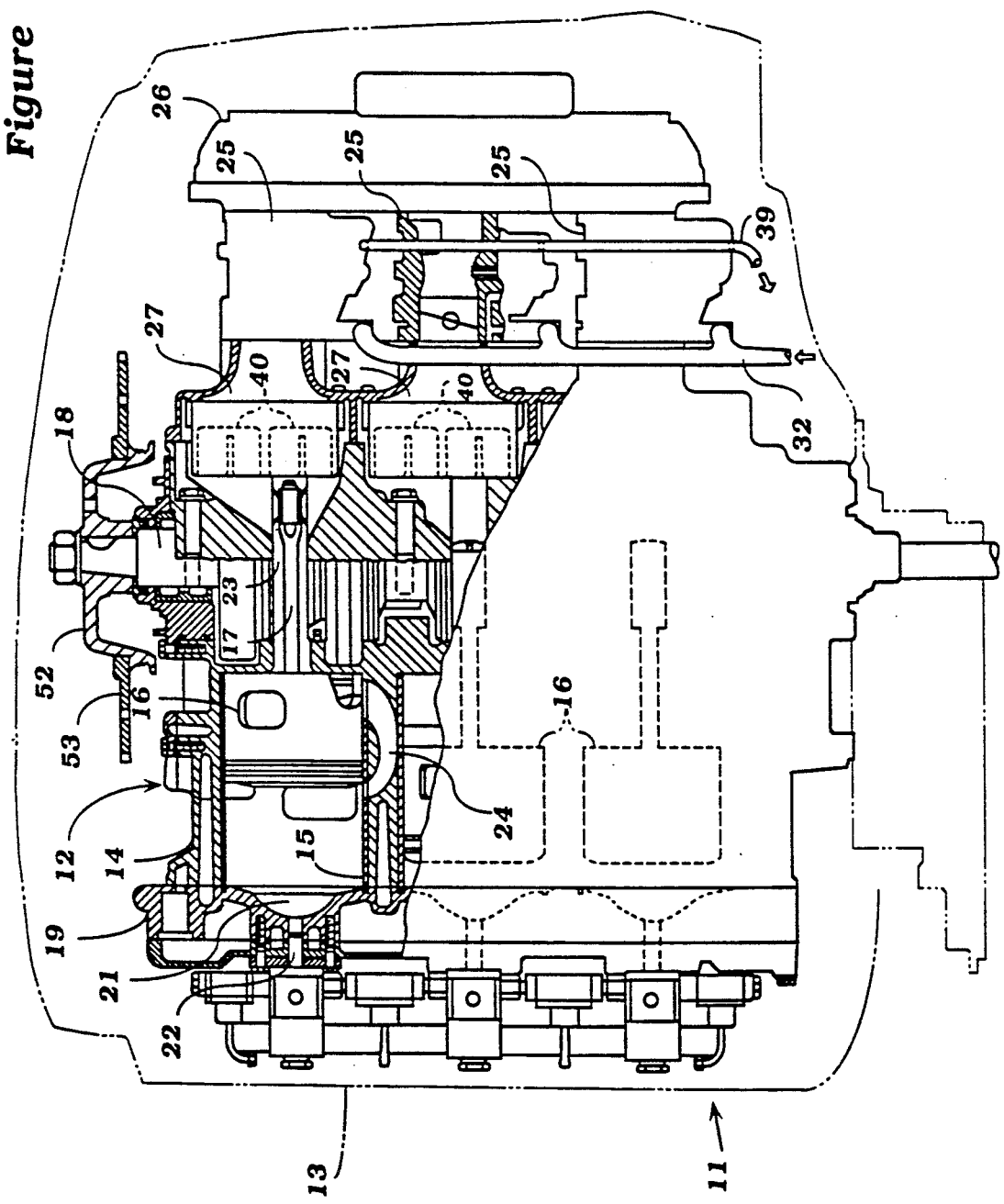
FIG. 1 is a side elevational view of the power head of an outboard motor constructed in accordance with an embodiment of the invention, with the protective cowling shown in phantom and portions of the engine broken away and shown in section.
Figure 2:
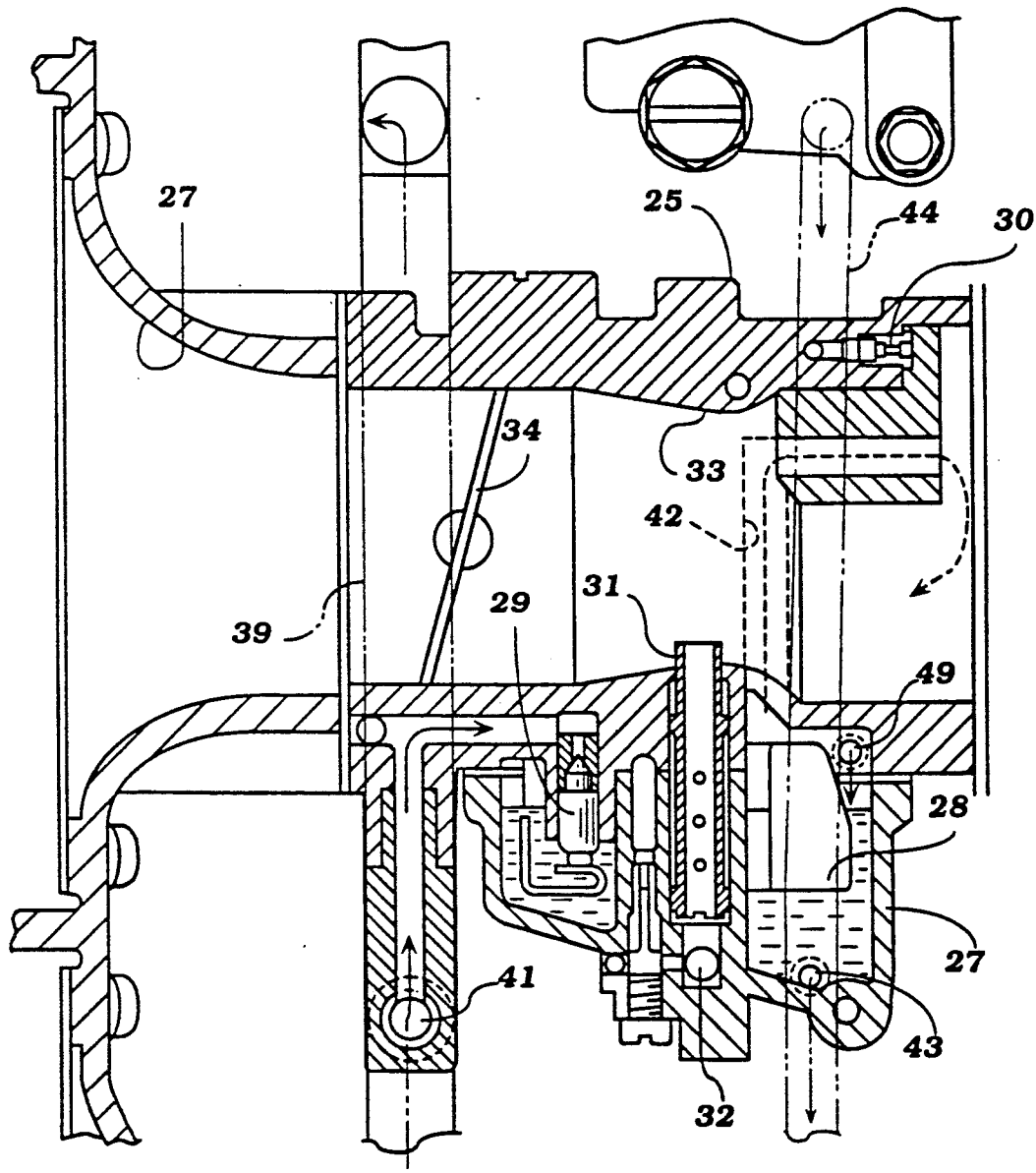
FIG. 2 is an enlarged cross sectional view taken through one of the carburetors of the engine.

Referring now in detail to the drawings and initially to FIGS. 1 and 2, the power head of an outboard motor constructed in accordance with an embodiment of the invention is identified generally by the reference numeral 11. The invention is described in conjunction with an outboard motor since it has particular utility in conjunction with outboard motors. This is particularly true since the invention or at least certain phases of it have particular utility with two cycle crankcase compression internal combustion engines as are popularly employed for the power sources of such engines. It is to be understood by those skilled in the art, however, that the invention can be utilized in conjunction with other applications than outboard motors and certain facets of the invention have application to other than two cycle crankcase compression engines.

The engine of the power head is identified generally by the reference numeral 12 and is surrounded by a protective cowling, which is shown in phantom and which is identified by the reference numeral 13. The engine 12 is, in the illustrated embodiment, of the V-6 type although it will be readily apparent to those skilled in the art how the invention can be applied to engines having other cylinder configurations, other cylinder numbers or, for that matter, engines other than reciprocating engines.

The engine 12 includes a cylinder block 14 having angularly disposed cylinder banks in which cylinder bores are formed by cylinder liners 15. Pistons 16 reciprocate in these cylinder bores and are connected by means of connecting rods 17 to a crankshaft 18 which is rotatably journaled about a vertically extending axis, as is conventional with outboard motor practice.

A respective cylinder head 19 is affixed to each cylinder bank of the engine in a known manner and has individual combustion chamber recesses 21 that combine with the cylinder bores and pistons 16 to provide the variable volume chambers of the engine which will, at times, be referred to as the combustion chambers. Fuel injection nozzles 22 are supported in the cylinder head 19 and each inject fuel into a respective one of the combustion chamber recesses 21. The fuel injectors 22 may be of the type which only inject fuel or which inject a fuel air mixture. The specific form of the type of fuel injector 22 employed is not a critical feature of the invention.

In addition to the fuel injectors 22, the engine is provided with a charge forming system for supplying a charge to individually sealed crankcase chambers 23 of the engine for eventual delivery to the combustion chambers 21 through a plurality of scavenge or transfer passages 24. This charge forming system includes a plurality of individual carburetors 25, preferably one providing an individual barrel for each cylinder of the engine and which receive an air charge from an air silencer 26 from the area within the protective cowling 13. The fuel air charge formed by the carburetors 25 is then delivered to the crankcase chambers 23 through a manifold system 27 in which reed type check valves 40 are provided so as to avoid reverse flow through the carburetors 25, as is well known in this art.

Referring now in detail primarily to FIG. 2, each carburetor 25 is provided with a respective fuel bowl 20 in which a float 28 and float operated valve 29 is provided for maintaining a uniform head of fuel in the respective carburetor 25. Fuel is supplied to these fuel bowls 20 in a manner which will be described.

Each carburetor 25 is designed so as to provide only a high speed fuel discharge consisting of a main nozzle 31 that receives fuel from a main well 32 through an appropriate metering jet and which discharges into the venturi section 33 of the carburetor 25. Only a main fuel supply system is incorporated, for a reason which will be described. The main nozzle 31 is designed so as to begin its discharge at the mid range running of the engine and continue the discharge of fuel up to wide open throttle full speed operation. An air bleed 30 supplies air to the main nozzle 31 in a known manner.

A throttle valve 34 is provided in each carburetor 25 downstream of the venturi section 33. The throttle valves 34 are all operated in unison by means of a remotely positioned throttle control, which may be of any conventional type.

Figure 4:
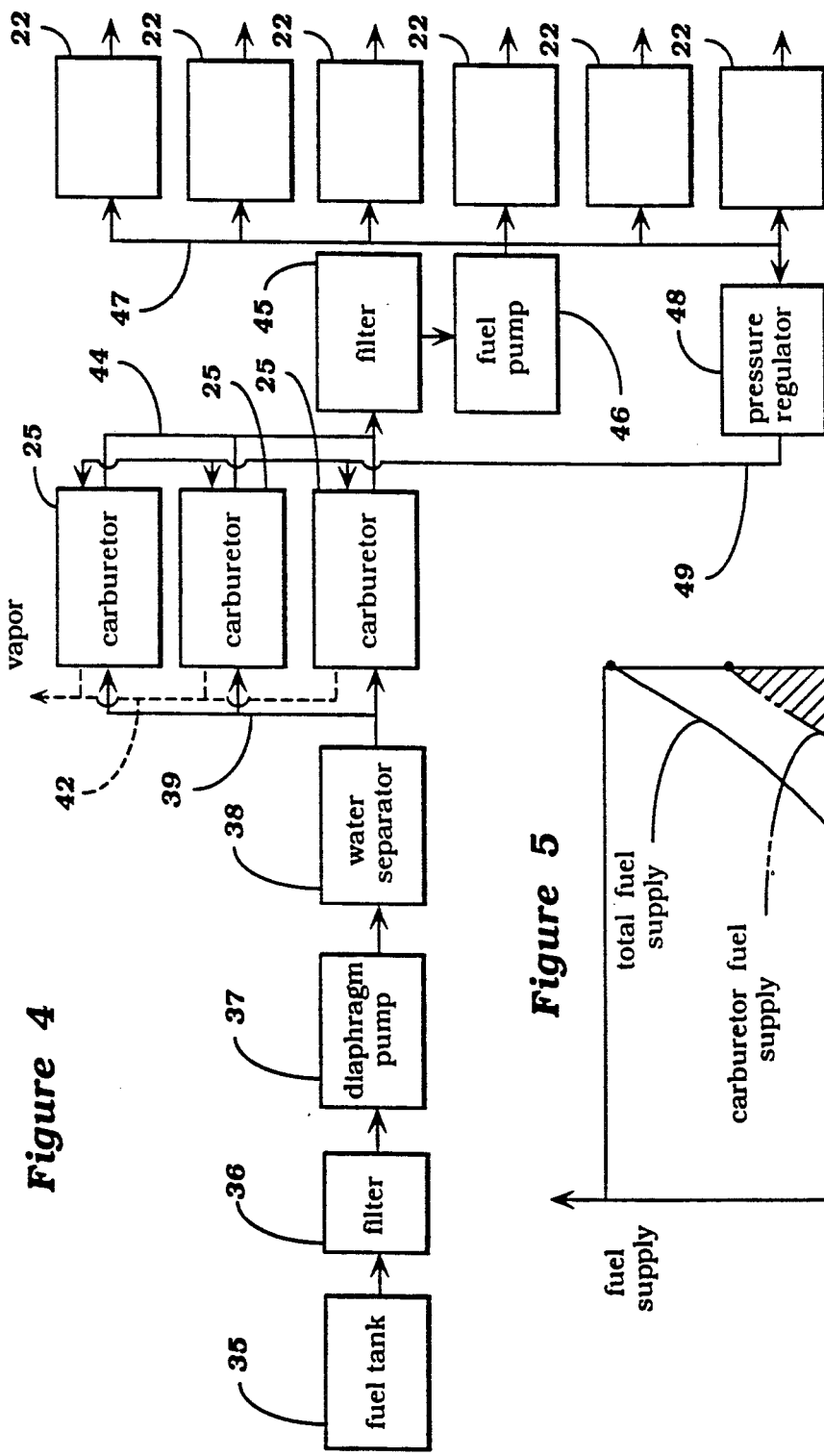
FIG. 4 is a schematic view showing the fuel supply system.

The fuel supply system for supplying fuel to the carburetors 25 and fuel injectors 22 may be best understood by reference to FIG. 4, although certain components of the fuel supply system are also shown in the remaining figures. It should be noted that in this figure, the carburetors 25 are shown as being of the two barrel type so that there are three carburetors, each having a respective barrel associated with one of the cylinders of the engine. As previously noted, the invention can be also employed in conjunction with individual carburetors for each cylinder or other variants thereof which are well known in this art.

Figure 3:
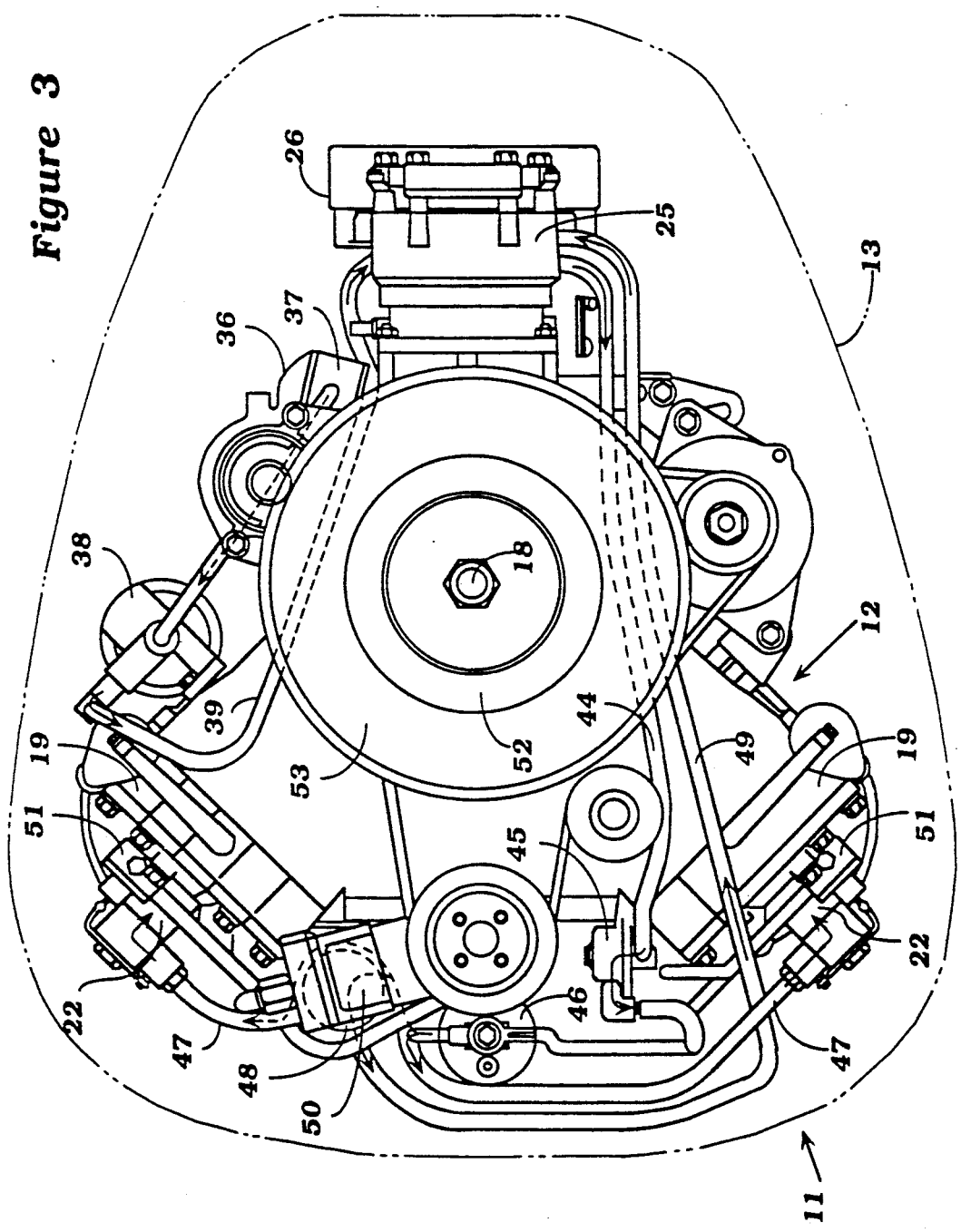
FIG. 3 is a top plan view of the power head, with the protective cowling shown in phantom.

The fuel supply system for the engine 12 includes a remotely positioned fuel tank 35 which, in connection with watercraft application, is normally positioned within the hull of the watercraft. Fuel is drawn from this tank 35 through a conduit in which a fuel filter 36 is incorporated. A diaphragm type pump 37, which is operated by the pulsations in one of the crankcase chambers, and which may be integrated with the filter 36, draws the fuel from the tank 35 and delivers it to a water separator 38 which is positioned within the power head as shown in FIG. 3 on one side of one of the cylinder blocks. Supply conduits 39 extend from the separator 38 to the individual fuel bowls 20 through a manifold or inlet pipe indicated by the reference numeral 41 in FIG. 2.

As has been previously noted, the float operated valves 29 maintain a uniform head of fuel in each of the fuel bowls 20. Each fuel bowl is also provided with a vent passage 42 which appears in FIG. 2 and which is also shown schematically in FIG. 4. The vent passages 42 vent vapors from the fuel bowls 20 back into the induction passages of the carburetors 25 upstream of the venturi sections 33. In this way, any fuel vapors which may be vented will not escape to the atmosphere.

At a lower well formed in each fuel bowl 20, there is provided a discharge port 43 that communicates with a conduit 44 for delivery of fuel to a further fuel filter 45 under the action of a high pressure fuel pump 46 which is driven in a suitable manner. This pressurized and filtered fuel is then delivered through conduits 47 to not only the individual injectors 22 but also to a fuel pressure regulator 48. The pressure regulator 48 maintains a uniform fuel pressure by bypassing excess fuel back to the fuel bowls 20 through a return passageway 49. This passageway also appeared in FIG. 2 and communicates with the fuel bowls 20 above the normal fuel level therein.

The fuel injection nozzles 22 are, in the illustrated embodiment, air fuel injection type and receive air under pressure from an air pump 50 that is driven from the engine in a known manner as by a belt. The fuel is supplied to a fuel injector through a pressure damper 51 associated with the injection nozzles 22. Of course, the invention can be used with systems in which only fuel is injected.

Figure 5:
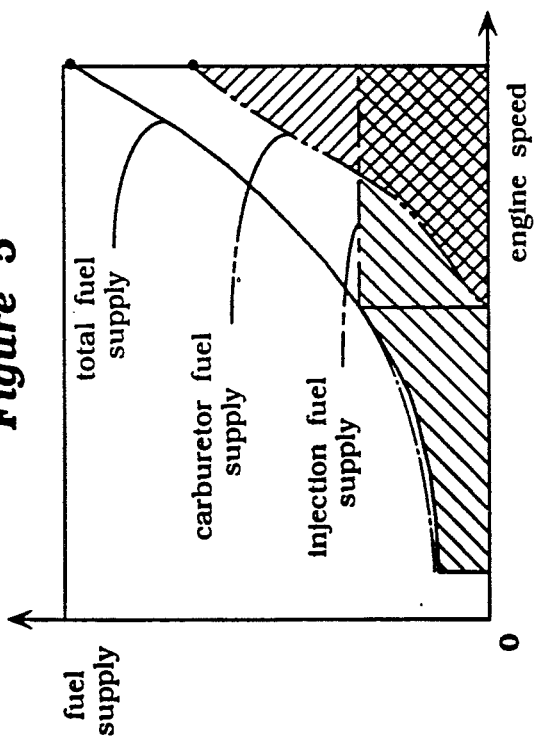
FIG. 5 is a graphic view showing the proportions of fuel supplied by the various charge forming devices throughout the engine speed and load ranges.

The strategy for supplying the fuel to the respective components of the engine may be best understood by reference to FIG. 5. The basic strategy of fuel supply is that the fuel injectors 22 supply all of the low speed fuel requirements of the engine and a portion of the mid and high range supply. As may be seen in FIG. 5, the fuel injection supply from the nozzles 22 gradually increases as engine speed increases up until the point X, which is at the lower end of the mid to high speed region at which time the carburetors 25 then begin to supply fuel. At this point, the fuel injection supply is at its maximum and the carburetors 25 provide a progressively increasing supply of fuel so that the total fuel supply is as shown in this curve. As a result, the fuel injectors need not be of a large capacity. This means that the high speed pressure pump 45 can be of a relatively low volume and can be relatively small so as to make a compact engine. Also, this will insure that there will be adequate fuel supply to the engine for the crankcase for cooling of the lower side of the piston, the connecting rods and the components associated therewith by vaporization of the fuel. Also, a simplified fuel delivery arrangement is then possible for the injectors 22 and the injectors can be tailored to provide good control for the low speed running and hence good emission control.

The engine also includes a fly wheel 52 that is affixed to the upper end of the crankshaft 18 and which carries a fly wheel portion 53 that has a starter gear and a timer arrangement for controlling the ignition of the engine through a magneto generator associated therewith as well as providing the appropriate timing pulses for the injectors 22.

It should be readily apparent from the foregoing description that the described construction is particularly useful in providing good fuel air supply for the engine throughout its entire running, adequate fuel and adequate fuel control at the critical low speed ranges and also simplifies the vapor separation system for the fuel injection system. It is to be understood, however, that the foregoing description is that of a preferred embodiment of the invention and that various changes and modifications may be made without departing from the spirit and scope of the invention, as defined by the appended claims.

I claim:

1. A charge forming system for a two cycle crankcase compression internal combustion engine comprising a combustion chamber, a crankcase, scavenge passage means for transferring a charge from said crankcase to said combustion chamber, a carburetor and manifold system for supplying a fuel air mixture to said crankcase at least under certain running conditions, a fuel injector for delivering at least fuel to said combustion chamber from a point other than through said crankcase for running at least under certain running conditions, and means for supplying fuel to said carburetor and said fuel injector, said fuel injector supplying fuel to said engine primarily for its low speed operation and said carburetor supplying fuel air mixture to said engine for its mid range and high speed running.

2. A charge forming system for a two cycle crankcase compression internal combustion engine comprising a combustion chamber, a crankcase, scavenge passage means for transferring a charge from said crankcase to said combustion chamber, a carburetor and manifold system for supplying a fuel air mixture to said crankcase of said engine at least under certain running conditions, a fuel injector for delivering at least fuel to said combustion chamber from a point other than through said crankcase for running at least under certain running conditions, and means for supplying fuel from a common fuel source to said carburetor and said fuel injector.

3. A charge forming system as set forth in claim 2 wherein the carburetor supplies fuel air mixture to the engine for its mid range and high speed running.

4. A charge forming system as set forth in claim 2 wherein the fuel injector supplies fuel to the engine primarily for its low speed operation.

5. A charge forming system as set forth in claim 4 wherein the carburetor supplies fuel air mixture to the engine for its mid range and high speed running.

6. A charge forming system as set forth in claim 1 wherein the fuel injector continues to supply a fixed amount of fuel to the combustion chamber after the carburetor begins to supply fuel.

7. A charge forming system as set forth in claim 6 wherein the fuel injector supplies fuel directly to the combustion chamber of the engine.

8. A charge forming system as set forth in claim 2 wherein the fuel injector supplies fuel directly to the combustion chamber of the engine.

9. A charge forming system for a two cycle crankcase compression internal combustion engine comprising a fuel tank, said engine having a combustion chamber, a crankcase and scavenge passage means for transferring a charge from said crankcase to said combustion chamber, a carburetor and manifold system for supplying a fuel air mixture to crankcase at least under certain running conditions, a fuel injector for delivering at least fuel to said combustion chamber at a point other than said crankcase for running at least under certain running conditions, and means for supplying fuel to said carbureteor and said fuel injector from said fuel tank first to said carburetor and then from said carburetor to said fuel injector.

10. A charge forming system as set forth in claim 9 wherein the carburetor includes a fuel bowl and vapor vent therefor and the fuel is supplied from the fuel tank to the fuel bowl and from the fuel bowl to the fuel injectors so that the fuel bowl vent vents vapor from the fuel supplied to the fuel injector.

11. A charge forming system as set forth in claim 10 wherein there are a plurality of carburetors and a plurality of fuel injectors.

12. A charge forming system as set forth in claim 11 wherein fuel is supplied from all of the carburetor fuel bowls to the fuel injectors.

13. A charge forming system as set forth in claim 12 wherein the carburetor supplies fuel air mixture to the engine for its mid range and high speed running.

14. A charge forming system as set forth in claim 12 wherein the fuel injector supplies fuel to the engine primarily for its low speed operation.

15. A charge forming system as set forth in claim 13 wherein the carburetor supplies fuel air mixture to the engine for its mid range and high speed running.

16. A charge forming system as set forth in claim 15 wherein the fuel injector continues to supply a fixed amount of fuel to the combustion chamber after the carburetor begins to supply fuel.

17. A charge forming system as set forth in claim 8 wherein fuel is supplied from a fuel tank first to the carburetor and then from the carbureteor to the fuel injector.

18. A charge forming system as set forth in claim 17 wherein the carburetor includes a fuel bowl and vapor vent therefor and the fuel is supplied from the fuel tank to the fuel bowl and from the fuel bowl to the fuel injectors so that the fuel bowl vent vents vapor from the fuel supplied to the fuel injector.

19. A charge forming system as set forth in claim 18 wherein there are a plurality of carburetors and a plurality of fuel injectors.

20. A charge forming system as set forth in claim 19 wherein fuel is supplied from all of the carburetor fuel bowls to the fuel injectors.

21. A charge forming system for an engine comprising a carburetor for supplying a fuel air mixture to said engine, said carburetor having a fuel bowl, means for supplying fuel to said fuel bowl, a vapor vent for venting vapors from said fuel bowl, a fuel injector for supplying at least fuel to said engine, and means for delivering fuel from said fuel bowl to said fuel injector for removing vapors from the fuel supplied thereto without requiring a separate vapor separator for said fuel injector.

22. A charge forming system as set forth in claim 21 further including a high pressure injection pump for receiving fuel from the fuel bowl and delivering it to the fuel injector.

23. A charge forming system as set forth in claim 22 further including means interposed between the high pressure fuel pump and the fuel injector for regulating the pressure applied to the fuel injector by bypassing excess fuel.

24. A charge forming system as set forth in claim 23 wherein the bypassed fuel is returned to the fuel bowl.

25. A charge forming system as set forth in claim 21 wherein the carburetor supplies fuel to the engine for a certain running condition and the fuel injector supplies fuel to the engine for a certain running condition.

26. A charge forming system as set forth in claim 25 wherein the carburetor supplies fuel air mixture to the engine for its mid range and high speed running.

27. A charge forming system as set forth in claim 25 wherein the fuel injector supplies fuel to the engine primarily for its low speed operation.

28. A charge forming system as set forth in claim 27 wherein the carburetor supplies fuel air mixture to the engine for its mid range and high speed running.

29. A charge forming system as set forth in claim 28 wherein the fuel injector continues to supply a fixed amount of fuel to the combustion chamber after the carburetor begins to supply fuel.

30. A charge forming system as set forth in claim 29 wherein the fuel injector supplies fuel directly to the combustion chamber of the engine.

31. A fuel supply system for a crankcase compression two cycle internal combustion engine comprising a first fuel supply system including a fuel injector for supplying fuel directly to the combustion chamber of the engine and a second fuel supply system including a carburetor for supplying fuel to the crankcase of the engine for transfer to the combustion chamber, said first fuel supply system supplying the sole fuel for the engine at low speed operation and a fixed amount of fuel to the engine during the mid range and high speed performance of the engine, said second fuel supply system supplying no fuel to the engine during the low speed operation and a variable supply of fuel to the engine during its mid range and high speed running.

* * * * *